(12) United States Patent
Goenka et al.

(10) Patent No.: US 12,132,694 B2
(45) Date of Patent: *Oct. 29, 2024

(54) METHOD AND SYSTEM FOR SERVING PERSONALIZED CONTENT TO ENHANCE USER EXPERIENCE

(71) Applicant: Yahoo Assets LLC, Dulles, VA (US)

(72) Inventors: Mohit Goenka, Santa Clara, CA (US); Kelly Xu, Union City, CA (US); Muni Xu, San Jose, CA (US); Shiv Shankar, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,180

(22) Filed: Jun. 13, 2023

(65) Prior Publication Data

US 2023/0328025 A1 Oct. 12, 2023

Related U.S. Application Data

(63) Continuation of application No. 17/492,746, filed on Oct. 4, 2021, now Pat. No. 11,855,944.

(51) Int. Cl.
| | | |
|---|---|---|
| *H04L 51/224* | (2022.01) | |
| *G06F 16/909* | (2019.01) | |
| *H04L 51/222* | (2022.01) | |
| *H04L 51/42* | (2022.01) | |
| *H04L 67/306* | (2022.01) | |

(52) U.S. Cl.
CPC .......... *H04L 51/224* (2022.05); *G06F 16/909* (2019.01); *H04L 51/222* (2022.05); *H04L 51/42* (2022.05); *H04L 67/306* (2013.01)

(58) Field of Classification Search
None
See application file for complete search history.

(56) References Cited

U.S. PATENT DOCUMENTS

| | | | | |
|---|---|---|---|---|
| 7,076,244 B2* | 7/2006 | Lazaridis | ............ | H04M 3/4878 705/14.1 |
| 7,599,852 B2* | 10/2009 | Bosarge | ............. | G06Q 30/0255 705/14.49 |
| 7,698,339 B2* | 4/2010 | Zhang | .................... | G06F 16/345 707/755 |
| 7,730,081 B2* | 6/2010 | Bromm | ................ | G06Q 10/107 715/752 |
| 7,752,074 B2* | 7/2010 | Bosarge | ............. | G06Q 30/0271 705/14.54 |

(Continued)

*Primary Examiner* — Backhean Tiv
(74) *Attorney, Agent, or Firm* — Bookoff McAndrews, PLLC

(57) ABSTRACT

A method for presenting personalized content to a user includes receiving user data corresponding to a user having a user profile, the user data including at least one or more messages in a user mailbox and a user web browser history within a network, extracting one or more data tags from the received user data, associated at least one data tag with a message, finding information in the network that corresponds to the associated data tag, generating a notification for the user, the notification including the found information in the network, and outputting the generated notification to a user interface of a device of the user.

20 Claims, 7 Drawing Sheets

(56) References Cited

U.S. PATENT DOCUMENTS

| | | | | |
|---|---|---|---|---|
| 7,974,874 B2* | 7/2011 | Bosarge | G06Q 30/0255 | 705/14.66 |
| 8,112,487 B2* | 2/2012 | Leedberg | H04L 51/212 | 709/204 |
| 8,214,357 B2* | 7/2012 | Scott | G06Q 30/02 | 707/726 |
| 8,346,608 B2* | 1/2013 | Bosarge | G06Q 30/0251 | 705/14.49 |
| 8,655,731 B2* | 2/2014 | Bosarge | G06Q 30/0277 | 705/14.49 |
| 8,838,079 B2* | 9/2014 | Wehrs | G06Q 30/02 | 705/14.54 |
| 8,849,694 B1* | 9/2014 | Chatterjee | G06Q 30/0261 | 705/14.1 |
| 8,930,964 B2* | 1/2015 | Balakrishnan | G06F 9/542 | 719/318 |
| 8,949,721 B2* | 2/2015 | Bakalov | G06F 16/954 | 709/219 |
| 10,007,931 B2* | 6/2018 | Bosarge | G06Q 30/02 | |
| 10,366,400 B2* | 7/2019 | Moreau | G06Q 30/0255 | |
| 10,853,417 B2* | 12/2020 | Tagra | G06V 20/70 | |
| 11,055,377 B2* | 7/2021 | Marmon | H04L 67/60 | |
| 11,151,174 B2* | 10/2021 | Denholm | G06F 40/20 | |
| 11,475,410 B1* | 10/2022 | Studer | G06Q 10/109 | |
| 11,586,878 B1* | 2/2023 | Delany | G06N 3/08 | |
| 11,855,944 B2* | 12/2023 | Goenka | G06F 16/95 | |
| 2003/0191689 A1* | 10/2003 | Bosarge | G06Q 30/0254 | 705/14.35 |
| 2005/0038699 A1* | 2/2005 | Lillibridge | G06Q 30/02 | 705/14.35 |
| 2005/0114198 A1* | 5/2005 | Koningstein | G06Q 30/0243 | 705/14.42 |
| 2006/0036596 A1* | 2/2006 | Zhang | G06F 16/35 | 707/999.005 |
| 2006/0041472 A1* | 2/2006 | Lukose | G06Q 30/0275 | 705/14.66 |
| 2006/0229065 A1* | 10/2006 | Lazaridis | G06Q 30/02 | 455/414.3 |
| 2006/0282328 A1* | 12/2006 | Gerace | G06F 16/248 | 705/14.69 |
| 2007/0234207 A1* | 10/2007 | Turakhia | G06Q 10/107 | 705/14.54 |
| 2008/0162439 A1* | 7/2008 | Bosarge | G06Q 30/0255 | |
| 2008/0215692 A1* | 9/2008 | Bosarge | G06Q 30/0254 | 709/206 |
| 2008/0235083 A2* | 9/2008 | Bosarge | G06Q 30/0256 | 705/14.73 |
| 2008/0275873 A1* | 11/2008 | Bosarge | G06Q 30/0275 | 707/999.005 |
| 2008/0281927 A1* | 11/2008 | Vanderwende | G06F 40/258 | 709/206 |
| 2009/0030774 A1* | 1/2009 | Rothschild | G06Q 30/0273 | 705/14.1 |
| 2010/0138452 A1* | 6/2010 | Henkin | G06Q 30/02 | 707/803 |
| 2010/0153855 A1* | 6/2010 | Roberts | G06Q 10/107 | 715/752 |
| 2010/0169176 A1* | 7/2010 | Turakhia | G06Q 30/0256 | 705/14.54 |
| 2010/0223279 A1* | 9/2010 | Scott | G06Q 30/02 | 707/769 |
| 2010/0268601 A1* | 10/2010 | Bosarge | G06Q 30/0271 | 705/14.69 |
| 2010/0274628 A1* | 10/2010 | Kunz | G06Q 30/0255 | 707/E17.014 |
| 2012/0102064 A1* | 4/2012 | Becker | G06Q 30/00 | 707/769 |
| 2013/0054354 A1* | 2/2013 | Kunz | G06Q 10/107 | 705/14.72 |
| 2014/0052791 A1* | 2/2014 | Chakra | G06Q 10/107 | 709/206 |
| 2014/0156761 A1* | 6/2014 | Heffernan | H04L 67/02 | 709/206 |
| 2014/0188623 A1* | 7/2014 | McNeil | G06Q 50/01 | 705/14.66 |
| 2014/0200972 A1* | 7/2014 | Jeremias | G06Q 10/107 | 705/14.7 |
| 2015/0067486 A1* | 3/2015 | Hochman | G06F 40/274 | 715/257 |
| 2015/0154636 A1* | 6/2015 | Spitkovsky | G06Q 30/0256 | 705/14.54 |
| 2015/0186366 A1* | 7/2015 | Yan | G06F 16/2246 | 707/741 |
| 2015/0213496 A1* | 7/2015 | McDevitt | G06Q 30/0261 | 705/14.58 |
| 2015/0348126 A1* | 12/2015 | Baiya | G06Q 30/0264 | 705/14.66 |
| 2016/0087925 A1* | 3/2016 | Kalavagattu | H04L 51/066 | 709/206 |
| 2016/0350801 A1* | 12/2016 | Vincent | G06V 40/20 | |
| 2017/0200133 A1* | 7/2017 | Werner | G06Q 10/0633 | |
| 2017/0250930 A1* | 8/2017 | Ben-Itzhak | G06F 3/0488 | |
| 2018/0018706 A1* | 1/2018 | Tognetti | H04L 67/535 | |
| 2018/0101776 A1* | 4/2018 | Osotio | G06F 16/258 | |
| 2018/0152404 A1* | 5/2018 | Coppen | G06F 3/0485 | |
| 2019/0349320 A1* | 11/2019 | Karuppusamy | H04L 51/02 | |
| 2021/0365995 A1* | 11/2021 | Im | H04L 51/18 | |
| 2021/0392097 A1* | 12/2021 | Ahmed | H04L 67/75 | |
| 2021/0406447 A1* | 12/2021 | Hermann | G06F 40/106 | |
| 2022/0070133 A1* | 3/2022 | Santo | H04L 51/043 | |
| 2023/0141939 A1* | 5/2023 | Goenka | G06F 16/909 | 709/206 |
| 2023/0328025 A1* | 10/2023 | Goenka | H04L 67/306 | 709/206 |

* cited by examiner

METHOD AND SYSTEM FOR SERVING PERSONALIZED CONTENT TO ENHANCE USER EXPERIENCE

DETAILED DESCRIPTION

Cross-Reference To Related Application(s)

This patent application is a continuation of and claims the benefit of priority to U.S. application Ser. No. 17/492,746, filed on Oct. 4, 2021, the entirety of which is incorporated herein by reference.

TECHNICAL FIELD

The present disclosure relates to techniques for presenting personalized content to a user in a user interface, the personalized content being generated based on user data, including message information, historical shopping information, and user location information.

Background

Notifications serve as one of the strongest mediums for reengaging users with a given mobile application. Adding images to the notifications have increased user engagement by 50%. A problem exists, however, in that call-to-action for notifications, which refers to opening of notifications by a user, remains relatively low due to the notifications containing content that is irrelevant to the user's interest(s). For example, brand logos included in notifications add very limited value to the notifications. This problem is even more prominent for promotional emails, which has caused some users to limit e-mail notifications only for those e-mails from persons, i.e., contacts, and further diminishes the value of notifications.

Irrelevant content may also appear on other user interfaces, such as at the top of a user inbox or at the top of a series of messages. That is, the content may include information that the user is not interested in or does not like, which diminishes the value of content placed in such a location of a user interface.

The following disclosure provides a solution to the aforementioned technological voids.

SUMMARY OF THE DISCLOSURE

Embodiments of the present disclosure include systems and methods for presenting personalized content to a user.

In one aspect, a computer-implemented method for presenting personalized content to a user may include receiving, at at least one server, user data corresponding to a user having a user profile, the user data including at least one or more messages in a user mailbox and a user web browser history within a network, extracting, using at least one processor, one or more data tags from the received user data, and associating, using the at least one processor, at least one data tag, of the one or more data tags, with a message, of the one or more messages in the user mailbox. The method may also include finding, using the at least one processor, information in the network that corresponds to the associated at least one data tag, generating, using the at least one processor, a notification for the user, the notification including the found information in the network, and outputting the generated notification to a user interface of a device of the user.

In another aspect, a system for presenting personalized content to a user may include at least one server, a storage device that stores instructions, and at least one processor that executes instructions the instructions to perform a method, which may include receiving, at the at least one server, user data corresponding to a user having a user profile, the user data including at least one or more messages in a user mailbox and a user web browser history within a network, extracting, using the at least one processor, one or more data tags from the received user data, and associating, using the at least one processor, at least one data tag, of the one or more data tags, with a message, of the one or more messages in the user mailbox. The method may also include finding, using the at least one processor, information in the network that corresponds to the associated at least one data tag, generating, using the at least one processor, a notification for the user, the notification including the found information in the network, and outputting the generated notification to a user interface of a device of the user.

In still another aspect, a non-transitory computer-readable medium stores instructions for presenting personalized content to a user, the instructions configured to cause at least one processor to perform a method, which may include receiving, at at least one server, user data corresponding to a user having a user profile, the user data including at least one or more messages in a user mailbox and a user web browser history within a network, extracting, using the at least one processor, one or more data tags from the received user data, and associating, using the at least one processor, at least one data tag, of the one or more data tags, with a message, of the one or more messages in the user mailbox. The method may also include finding, using the at least one processor, information in the network that corresponds to the associated at least one data tag, generating, using the at least one processor, a notification for the user, the notification including the found information in the network, and outputting the generated notification to a user interface of a device of the user.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
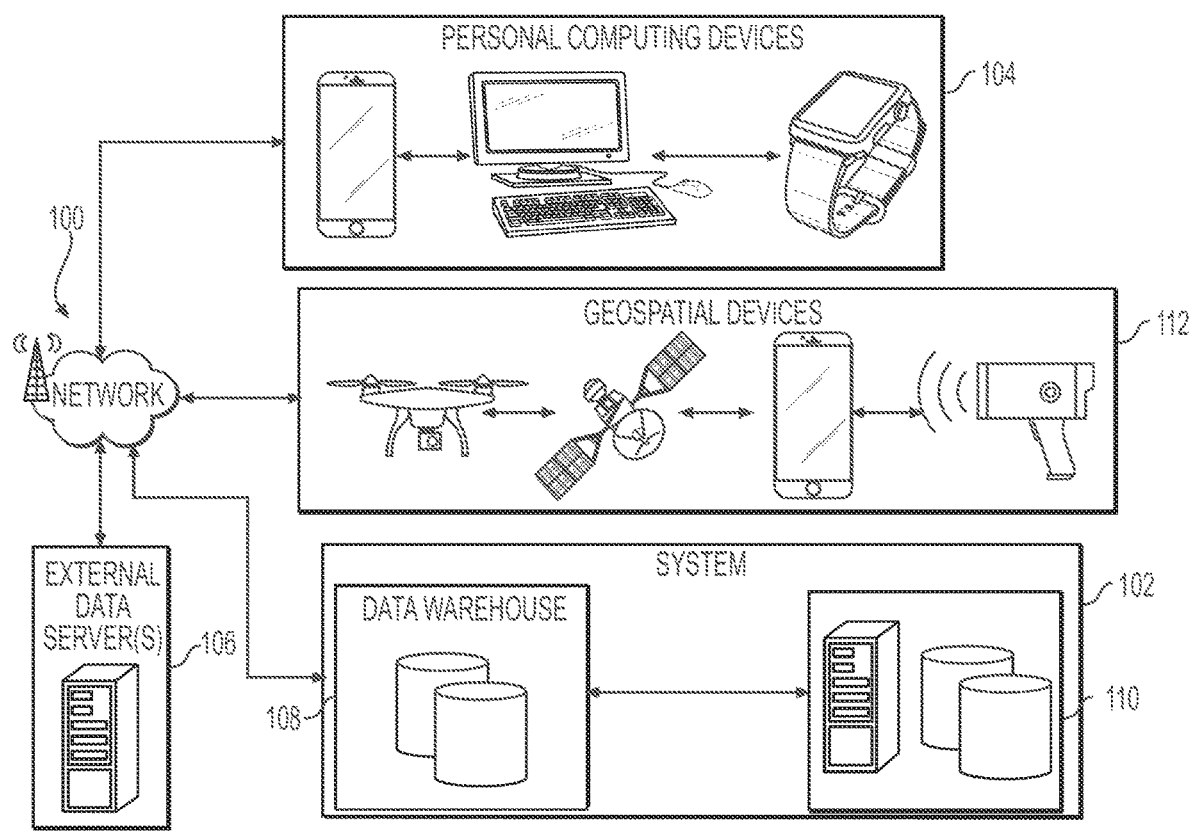
FIG. 1 is a schematic diagram illustrating an example of a network within which the systems and methods disclosed herein could be implemented according to embodiments of the present disclosure.

As described herein, embodiments of the present invention are directed to a method for presenting personalized content to a user, as well as a related system and non-transitory computer-readable storage medium. The method may include at least the steps of receiving user data corresponding to a user having a user profile, the user data including at least one or more messages in a user mailbox and a user web browser history within a network, and extracting one or more data tags from the received user data. The method may also include associating at least one data tag, of the one or more data tags, with a message, of the one or more messages in the user mailbox, finding information in the network that corresponds to the associated at least one data tag, and generating a notification for the user, the notification including the found information in the network. In addition, the method may include the step of outputting the generated notification to a user interface of a device of the user. These as well as other aspects of the present invention are described in more detail below.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for recommending where to conduct a transaction.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.llb/g/n, or the like. Network access technologies may enable wide area coverage for devices, such as personal computing devices with varying degrees of mobility, for example.

In short, a wireless network may include virtually any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal computing device may also include or execute an application to perform a variety of possible tasks, such as: browsing, searching, connecting to a network (e.g. the internet), receiving communications (e.g. phone call, emails, text messages, social media communications), streaming or displaying various forms of content, including locally stored or uploaded images and/or video, or games (such as live video calls).

As discussed herein, a user is an individual who uses a system in accordance with the embodiments described here. However, the concept of a user is meant to be exemplary, as there may be one or more users, a user group, or a combination thereof, that access the system.

FIG. 1 depicts an example of a network 100 within which a system 102, as disclosed herein, could be implemented. Through the network 100, the system 102 is connected to one or more user devices 104 belonging to one or more users. As an example, a user device may be a smartphone, although other devices may be used, such as a personal computer, a laptop, a tablet, a smartwatch, or other devices.

The system 102 is also connected to one or more external data servers 106, which store data received from the one or more user devices 104 and from the system 102. The external data server(s) 106 may include one or more of personal computers desktop computers, multiprocessor systems, microprocessor-based or programmable consumer electronics, database(s), network PCs, server(s), and the like, maintained by third parties storing business-to-business or business-to-consumer data (e.g. Verizon®, Apple®, Google®, Netflix®, Nordstrom®, Amazon®, a government entity, or the like). The system 102 may receive data stored on the external data server(s) 106 on one or more of its computing devices. The data stored at the external data server(s) 106 may include, without limitation, information related to: brand(s), brand product(s), product cost, service cost, product inventory, shipping costs, shipping delivery time, seating availability, seating arrangements, rewards information, weather, news, events, transportation (e.g. public and private data related to airplanes, rocket ships, trains, and aquatic vehicles), mobile devices (e.g. iPhone®), smart accessories (e.g. Apple Watch®), artificial intelligence enabled devices (e.g. Alexa®, Google home®, Facebook Portal®, and the like), and GPS data corresponding to a user device 104. The data may also include data specific to a user, obtained via connection to a user device 104, including, for example, user profile(s), contents of an e-mail inbox of a user, and a user web browser history within the network. The system 102 may receive or may be able to parse data from the external data server(s) 106 pertaining to specific user(s) whose user devices 104 are connected within the network 100. The system 102 may include a data warehouse 108 and an internal server 110, which may include additional data storage and one or more processors.

The system may also be connected to one or more geospatial devices 112 through the network. The geospatial devices 112 may be any device or sensor accessing the network 100 and capable of capturing, storing, manipulating, analyzing, managing, and presenting historical and real-time spatial or geographic data, especially as it relates to location data pertaining to the user device. Geospatial devices 112 may include, without limitation, drones, satellites, weather balloons, mobile devices, servers, databases personal computers, tables, and static and mobile radars. In addition, location data may be obtained using crowd sourcing techniques by correlating data gathered by a network of one or more users and correlating the gathered data from the one or more users with information received by any of the aforementioned geospatial devices 112.

Figure 2:
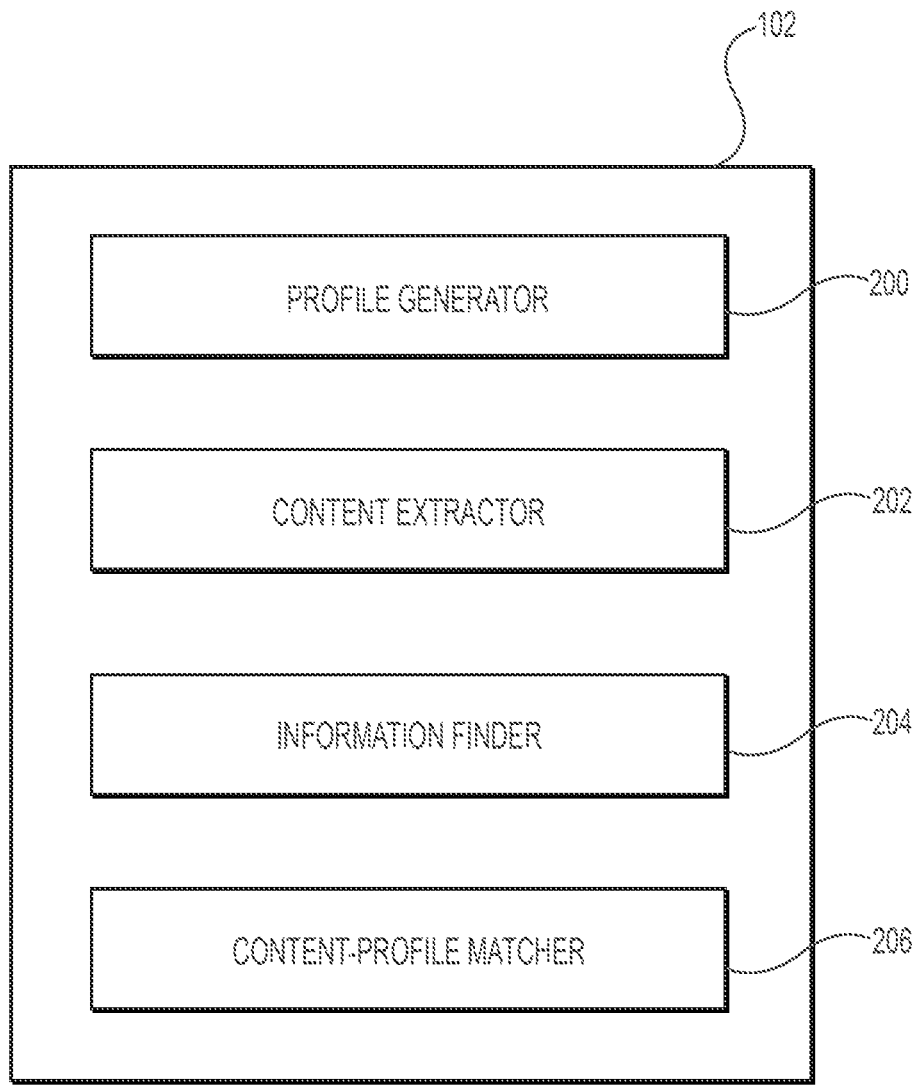
FIG. 2 is a schematic diagram illustrating an example of a system within which the methods disclosed herein could be implemented according to embodiments of the present disclosure.

FIG. 2 is a schematic diagram illustrating an example of the system 102 within which the methods disclosed herein may be implemented. The system 102 may include modules programmed to perform certain steps of the methods disclosed herein. The modules include a profile generator 200, a content extractor 202, an information finder 204, and a content-profile matcher 206. While an example of functionalities of modules 200, 202, 204, and 206 will now be described, it should be appreciated that in some cases the functionality of these modules may be combined into one or more modules, or functionality attributed to one module may be split across one or more other modules.

In one embodiment, the profile generator 200 is a component of the system 102 that may be responsible for generating a user profile 208 for a user. Profile generation is based on the content of, for example, a user's electronic mailbox, such as the electronic mailbox depicted in FIGS. 6-8, and the user's navigation history across the network 100. A user profile 208 may also be categorized, for example, as a deal finder, a shopper, a finance enthusiast, or a sports fan. Other categories may be applied to a user profile 208 by the profile generator.

The content extractor 202 is a component of the system 102 that may be responsible for extracting all the content from the received data that is capable of being tokenized for incoming messages in the user's electronic mailbox, for example. Other data may be processed by the content extractor 202, such as the web browsing history. In a case in which the content extractor 202 extracts content from incoming messages, the content extractor 202 creates a data tag and associates the data tag with a corresponding incoming message or a chain of messages (e.g., an e-mail chain). The data tag may include, for example, deals, products, brand names, or sports entities.

The information finder 204 is a component of the system 102 that may be responsible for finding (that is, processing and detecting) information, or content, within the network 100 that is associated with content matching the user profile 208.

Lastly, the content-profile matcher 206 is a component of the system 102 that may be responsible for matching the user profile 208 generated by the profile generator 200 with the information found by the content extractor 202, and finding at least one commonality between the two. The found information having at least one commonality with the content of the user profile 208 is then used in subsequent processing to generate and output a notification to a user, where the notification includes the found information.

Figure 3:
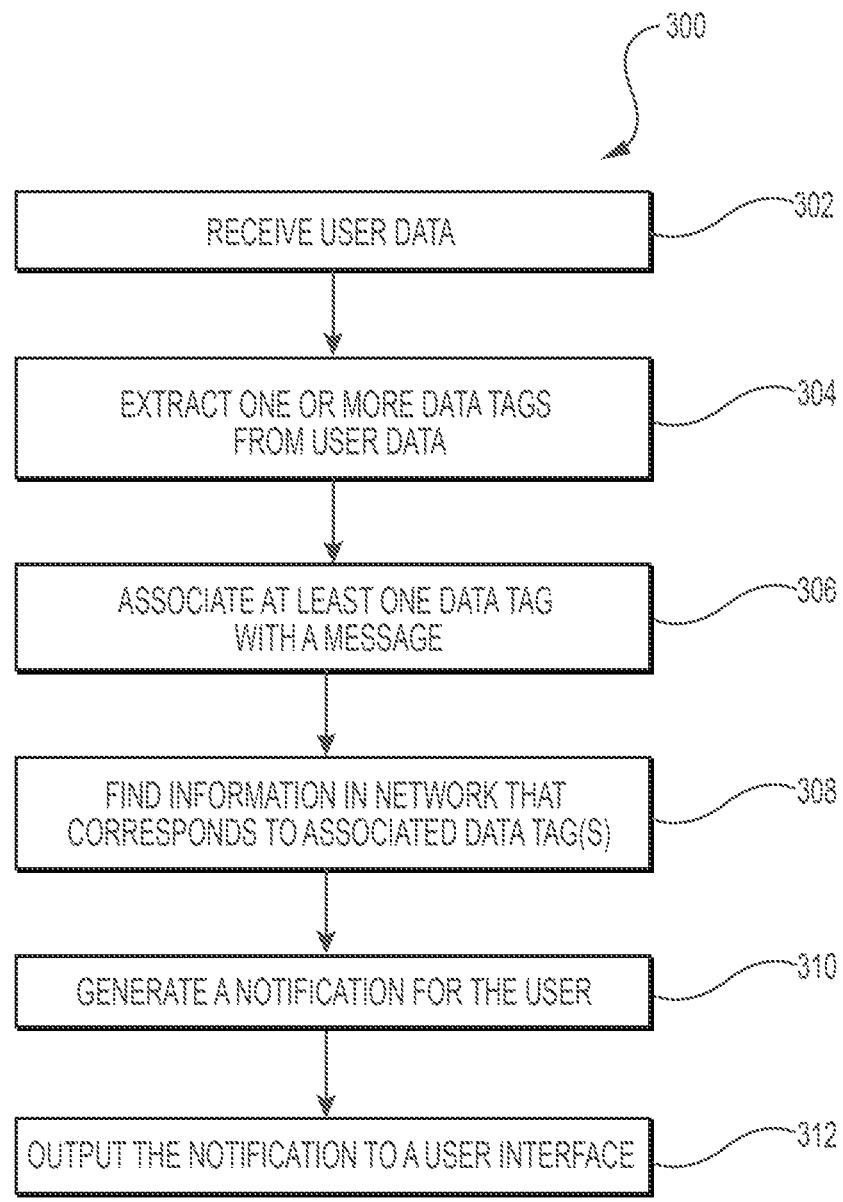
FIG. 3 depicts a flowchart for a method for presenting personalized content to a user according to embodiments of the present disclosure.

FIG. 3 depicts a flowchart for a method for presenting personalized content to a user according to embodiments of the present disclosure. In particular, FIG. 3 depicts the steps of a method 300, including a step 302 of receiving user data. The user data is received at a server of the system 102, and corresponds to a user having a user profile 208. The user data may include, for example, one or more messages from an electronic mailbox of the user, and a user web browser history within the network 100. In addition, in at least one embodiment, the user data may also include location data of a device of the user, the location data including at least one GPS tag. The GPS tag may be obtained, for example, from a location-identifying type capability of the device of the user. Further, the user data may be user data that has been generated within a predetermined amount of time. For example, the predetermined amount of time may be expressed in terms of weeks, days, hours, and/or minutes. As a specific example, the predetermined period may be a value between 1 day and 7 days, inclusive.

Next, in step 304, one or more data tags are extracted, using a processor of the system 102, from the received user data. Each data tag may include, for example, one or more of a brand name, a product, a deal for a product, a stock ticker, and event information. In step 306, the processor of the system 102 associates at least one of the extracted data tags with a message from the electronic mailbox of the user. Next, in step 308, the processor of the system finds information within the network 100 that corresponds to the associated data tag(s). In step 310, the processor of the system 102 generates a notification for the user, and the notification includes the information found within the network 100. In addition, in step 312, the generated notification is output from the system 102 to a user interface of a device of the user. For example, the generated notification may be displayed as a notification on a home screen of a user device. Alternatively, for example, the generated notification may be displayed near a message of the messages of the user inbox.

Although the method 300 is described as including steps 302 to 312, the method is not limited to these steps, and may include additional or alternative steps. In addition, although steps 302 to 312 of the method 300 are described in a particular order, it is within the scope of the invention to modify the order in which the steps are performed, as appropriate.

Figure 4:
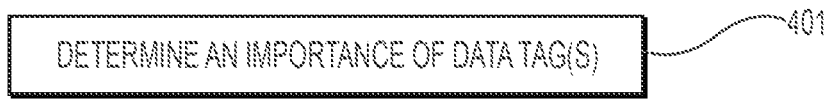
FIG. 4 depicts an additional step of the method shown in FIG. 3.

FIG. 4 depicts an additional step of the method shown in FIG. 3. In particular, FIG. 4 depicts a step 400 of determining, using the processor of the system 102, an importance of the data tag(s). The importance may be, for example, a value within a range of 0 to 10, with 0 representing a lowest importance, and 10 representing a highest importance. Importance may be determined, for example, by counting the number of times a word, image, symbol or other representation of the data tag appears within the received user data segment including the message, text, images, files, documents or any other component of the received data segment. In a case in which the method 300 includes the additional step 40, step 400 may, for example, be performed before the step 306 of associating the data tags with the message from the user's inbox. In such an embodiment, the data tags(s) having a relatively higher importance may be associated with the message. For example, the data tag(s) having an importance of 7 or greater may be associated with the message, while data tag(s) having an importance of less than 7 are not associated with the message.

Figure 5:
FIG. 5 depicts an additional step of the method shown in FIG. 3.

FIG. 5 depicts an additional step of the method shown in FIG. 3. In particular, FIG. 5 depicts a step 500 of receiving, using the processor of the system 102, additional user data within a more recent period of time. For example, if, in step 302 of the method 300, user data is obtained from within 7 days (that is, messages received within seven days and web browser history within 7 days), then, in step 500, additional user data of a subsequent day may be obtained. In such an embodiment, the steps 304-312 are performed again, based on and using the received additional user data, and a new notification may be generated and output to the user interface.

Figure 6:
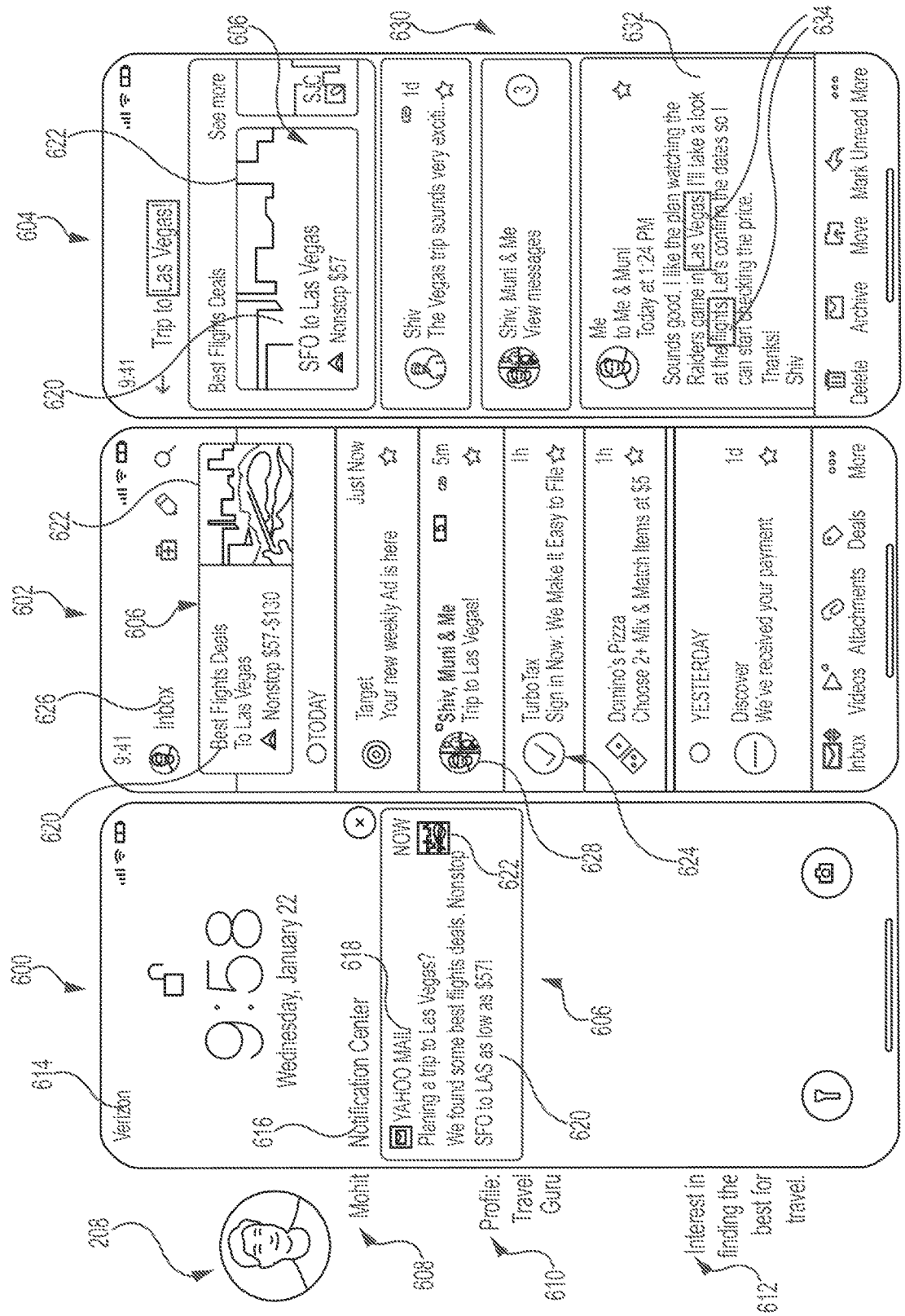
FIG. 6 depicts a graphical representation of a user profile and user interfaces to which notifications may be output according to embodiments of the present disclosure.

FIG. 6 depicts an exemplary graphical representation of a user profile 208 and user interfaces 600, 602, and 604 to which notifications 606 may be output, according to embodiments of the present disclosure. In the example shown in FIG. 6, the user profile 208 may include a user name 608, "Mohit," a user profile category 610, "Profile: Travel Guru," and one or more user profile descriptions 612, including "Interest in finding the best for travel." In one user interface 600, which may be a home screen 614 of the user device 104, a notification 606 may be displayed within a notification center 616. In this example, the notification 606 may include a heading 618, indicating the application from which the notification 606 was sent, here, "Yahoo Mail." The notification 606 may also include text 620, including, for example, a description of a deal. Here, the text 620 reads, "Planning a Trip to Las Vegas? We found some best flights deals, Nonstop SFO to LAS as low as $57!" In addition, the notification 606 may include an image 622, for example, of a location. In this example, the image 622 is a thumbnail image of Las Vegas. In another user interface 602, the notification 606 is shown at the top of a user's inbox. The notification 606 may include text 620, such as "Best Flights Deals To Las Vegas," and "Nonstop $57-$130." The notification 606 may also include images 622, such as a brand logo, here, the logo for Delta Air Lines®. The images may also include an image of Las Vegas. The interface 602 may depict messages 624 in a user's inbox 626, and may include the message 628 with which a data tag is associated in step 306 of the method 300. In the interface 604, the notification 606 may be shown at the top of an e-mail chain 630. The notification 606 may include text 620, including "SFO to Las Vegas," and "Nonstop $57." The notification 606 may also include an image 622, which in this example forms the background of the notification 606 over which the text 620 is displayed. The image 622 is an image of Las Vegas. The notification 606 may also include a series of images with text displayed thereon, allowing the user to scroll among the images of the series. The e-mail chain 630 includes each message 632 within the e-mail chain 630. Certain text within a message of the e-mail chain 630 may, for example, be shown with highlight, to emphasize data within the message that corresponds to a data tag 634 extracted from the message 632. In this example, the data tags 634 for "Las Vegas" and "Flights" are shown with highlighted text.

Figure 7:
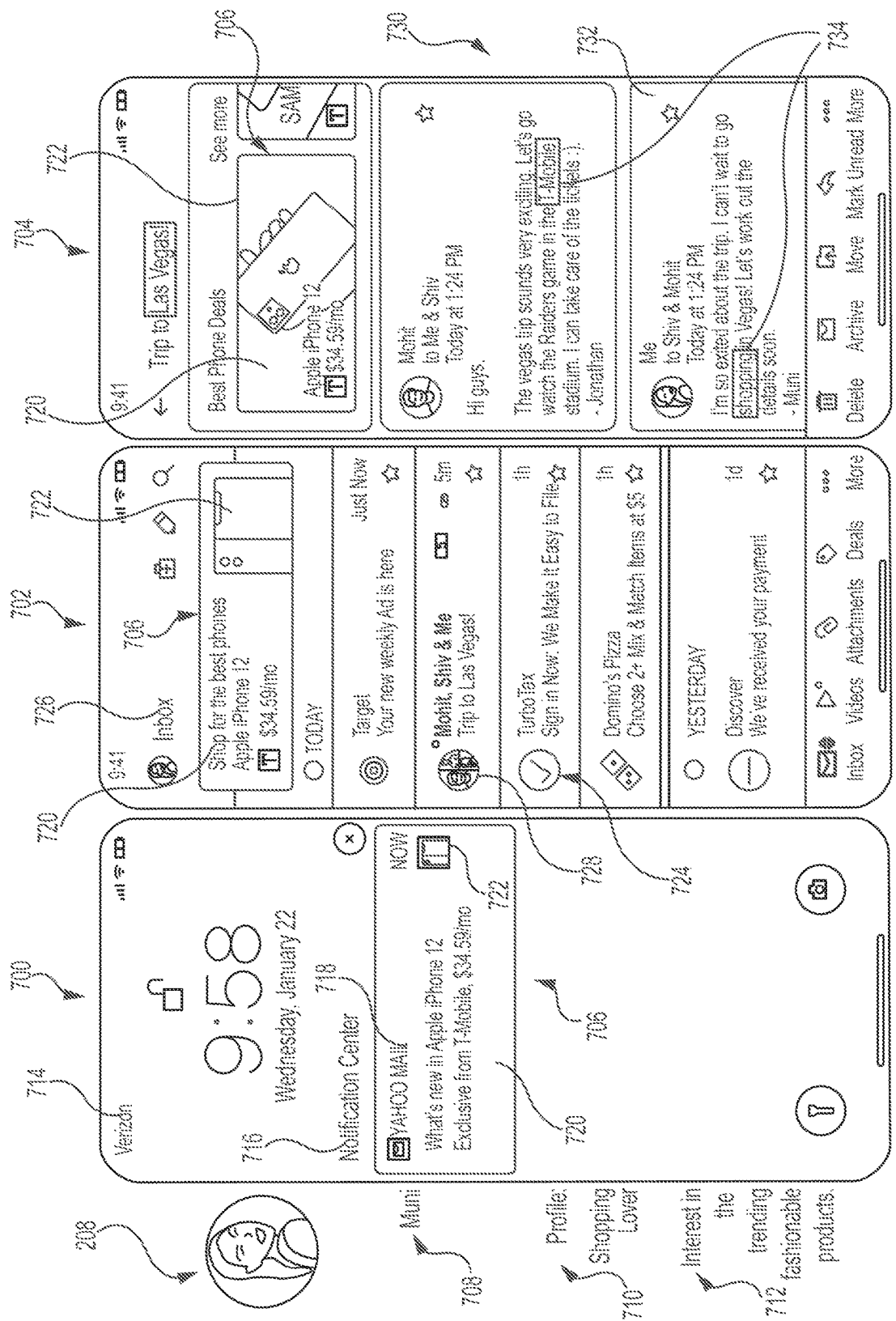
FIG. 7 depicts another graphical representation of a user profile and user interfaces to which notifications may be output according to embodiments of the present disclosure.

FIG. 7 depicts another exemplary graphical representation of a user profile 208 and user interfaces 700, 702, and 704 to which notifications may be output according to embodiments of the present disclosure. In this example, the user profile 208 may include a user name 708, "Muni," a user profile category 710, "Profile: Shopping Lover," and one or more user profile descriptions 712, including "Interest in the trending fashionable products." In one user interface 700, which may be a home screen 714 of the user device 104, a notification 706 may be displayed within a notification center 716. In this example, the notification 706 may include a heading 718, indicating the application from which the notification 706 was sent, here, "Yahoo Mail." The notification 706 may also include text 720, including, for example, a description of a deal. Here, the text 720 reads, "What's new in Apple iPhone 12 Exclusive from T-Mobile, $34.59/mo unlimited data plan. Learn more." In addition, the notification 706 may include an image 722, for example, of a product. In this example, the image 722 is a thumbnail image of an iPhone. In another user interface 702, the notification 706 is shown at the top of a user's inbox. The notification 706 may include text 720, such as "Shop for the best phones Apple iPhone 12 $34.59/mo." The notification 706 may also include images 722, such as a brand logo, here, the logo for T-Mobile®. The images 722 may also include an image of the product, here, the iPhone. The interface 702 may depict messages 724 in a user's inbox 726, and may include the message 728 with which a data tag is associated in step 306 of the method 300. In the interface 704, the notification 706 may be shown at the top of an e-mail chain 730. The notification 706 may include text 720, including "Apple iPhone 12 $34.59/mo." The notification 706 may also include an image 722, which in this example forms the background of the notification 706 over which the text 720 is displayed. The image 722 is an image of an iPhone. The notification 706 may also include a series of images with text displayed thereon, allowing the user to scroll among the images of the series. The e-mail chain 730 includes each message 732 within the e-mail chain 730. Text within a message of the e-mail chain 730 may, for example, be shown with highlight, to emphasize data within the message that corresponds to a data tag 734 extracted from the messages 732. In this example, the data tags 734 for "T-Mobile" and "shopping" are shown with highlighted text.

Figure 8:
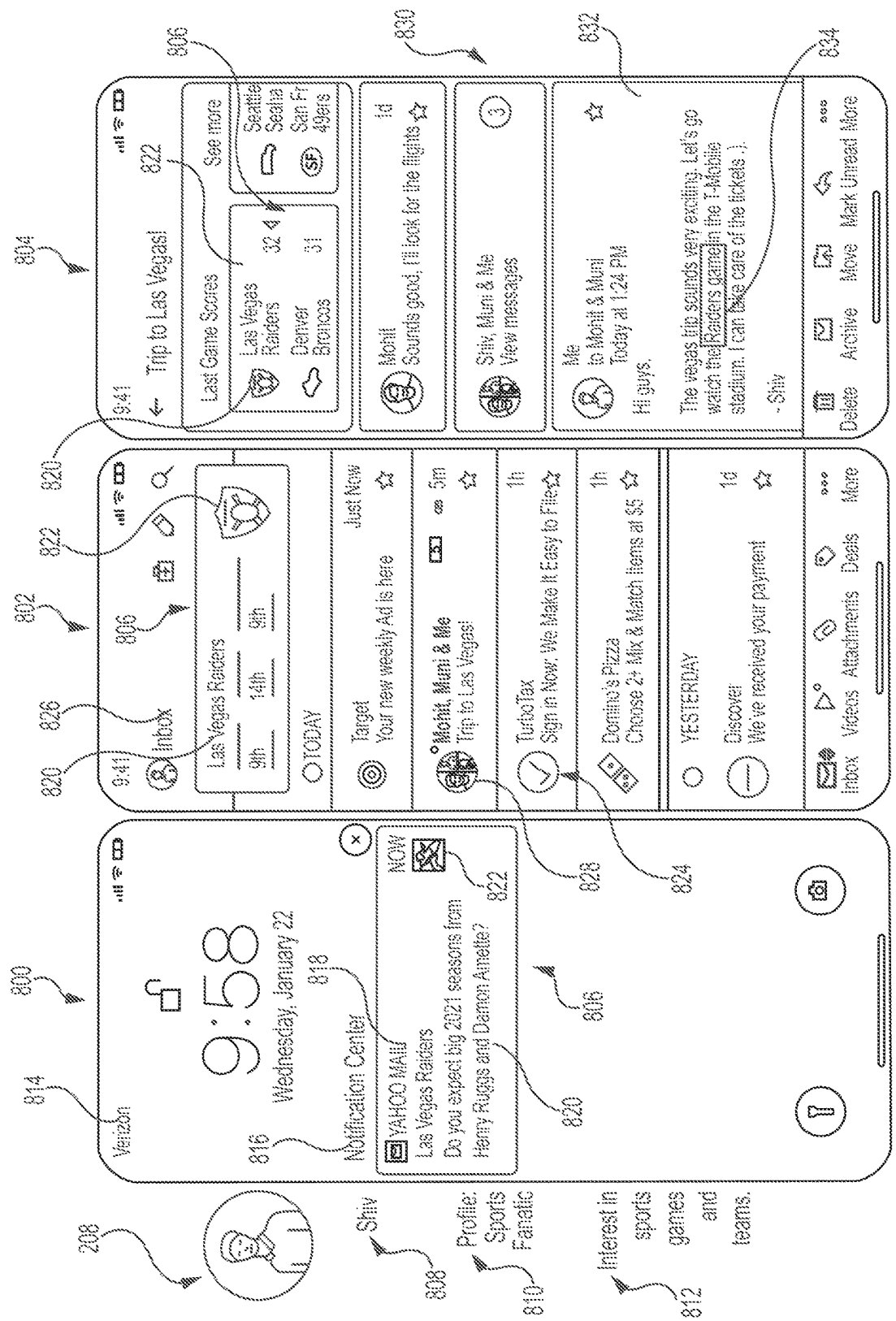
FIG. 8 depicts still another graphical representation of a user profile and user interfaces to which notifications may be output according to embodiments of the present disclosure.

FIG. 8 depicts still another exemplary graphical representation of a user profile 208 and user interfaces 800, 802, and 804 to which notifications may be output according to embodiments of the present disclosure. In this example, the user profile 208 may include a user name 808, "Shiv," a user profile category 810, "Profile: Sports Fanatic," and one or more user profile descriptions 812, including "Interest in sports and teams." In one user interface 800, which may be a home screen 814 of the user device 104, a notification 806 may be displayed within a notification center 816. In this example, the notification 806 may include a heading 818, indicating the application from which the notification 806 was sent, here, "Yahoo Mail." The notification 806 may also include text 820, including, for example, a prompt or message relating to the user's interest. Here, the text 820 reads, "Las Vegas Raiders Do you expect big 2021 seasons from Henry Ruggs and Damon Arnette?" In addition, the notification 806 may include an image 822, for example, of athletes. In this example, the image 822 is a thumbnail image of two football players. In another user interface 802, the notification 806 is shown at the top of a user's inbox. The notification 806 may include text 820, such as "Las Vegas Raiders Passing Yards $9^{th}$ Rushing Yards $14^{th}$ Total Yards Per Game $9^{th}$." The notification 806 may also include images 822, such as a logo, here, the logo for the Las Vegas Raiders®. The interface 802 may depict messages 824 in a user's inbox 826, and may include the message 828 with which a data tag is associated in step 306 of the method 300. In the interface 804, the notification 806 may be shown at the top of an e-mail chain 830. The notification 806 may include text 820, including "Last Game Scores Las Vegas Raiders 32 Denver Broncos 31 final." The notification 806 may also include images 822, which in this example include logos for the Las Vegas Raiders and the Denver Broncos. The notification 806 may also include a series of images with text displayed thereon, allowing the user to scroll among the images of the series. In this example, as the user profile is a sports fanatic, the series may include other game scores. The e-mail chain 830 may include each message 832 within the e-mail chain 830. Text within a message of the e-mail chain 830 may, for example, be shown with highlight, to emphasize data within the message that corresponds to a data tag 834 extracted from the message 832. In this example, the data tag 734 for "Raiders game" is shown with highlighted text.

In the examples shown in FIGS. 6-8, and described above, the notifications correspond to an interest of each user. The notifications may be updated, however, based on more recent and/or additional data received from a user device. That is, in a case in which the method 300 includes the step 500 of receiving additional user data, such as GPS data obtained within a more recent window of time, and indicating that the user device 104 is within a proximity, for example, of 1 mile, of a sports stadium, the method 300 may repeats steps 304-312, to thereby generate and output a notification relating to an upcoming game at the sports stadium, to a user such as Mohit, whose interest may not necessarily be sports games and teams.

By virtue of the systems and methods described herein, notifications may be generated and presented to a user while increasing user engagement due to the increased relevance of content provided in the notifications. That is, because the content of the notifications, in the form of text, images, or both, more closely corresponds to a user's interests, the notifications have greater value in generating call-to-action and engagement by the user. Further, such notifications may be generated even based off of personal e-mails (that is, without the use of promotional e-mails, which may be ignored by a user).

One having ordinary skill in the art will recognize that the aforementioned examples and embodiments are not meant to be limiting and can be implemented in combination with any disclosed features or other examples and embodiments. Furthermore, while the terms user, member, and user group are defined, one having ordinary skill in the art that like terms, for example, first user, second user, third user, and so on, when used, are meant to precisely identify one or more individuals categorized as either a user, member, or user group.

What is claimed is:

1. A computer-implemented method for presenting personalized content to a user, the method comprising:
   receiving, at a server, user data corresponding to a user profile and at least one message of a user;
   extracting, using at least one processor, two or more data tags from the received user data;
   associating, using the at least one processor, at least one of the extracted data tags with a message of the at least one message of the user, wherein the associating is based on relative importance;
   finding, using the at least one processor, information in a network that corresponds to the associated data tag; and
   generating a display on a user device, using the at least one processor, the display comprising information in the network and an email chain with highlighted text corresponding to the relative importance of the associated data tag.

2. The method of claim 1, wherein the relative importance is calculated by assigning an importance value, and wherein the importance value is determined by counting a number of times a word, image, symbol, or other representation of each data tag appears within a segment of the received user data.

3. The method of claim 1, wherein the user data further includes location data, and wherein the two or more data tags include at least one GPS tag from the location data.

4. The method of claim 1, further comprising receiving, at the server, additional user data,
   wherein the extracting, associating, finding, and generating are performed based on the received additional user data, thereby generating a new display that is output to a user interface.

5. The method of claim 1, wherein each data tag, of the two or more data tags, comprises one or more of a brand name, a product, a deal for a product, a stock ticker, and event information.

6. The method of claim 1, wherein the display is configured to be displayed on a home screen of a device of the user.

7. The method of claim 1, wherein the display is configured to be displayed near a message, of the one or more messages in a user mailbox.

8. The method of claim 1, wherein the user data includes user data generated within a predetermined period of time.

9. A system for presenting personalized content to a user, the system comprising:
   a server;
   a storage device that stores instructions; and
   at least one processor that executes instructions the instructions to perform a method comprising:
   receiving, at the server, user data corresponding to a user profile and at least one message of a user;
   extracting, using at least one processor, two or more data tags from the received user data;
   associating, using the at least one processor, at least one of the extracted data tags with a message of the at least one message of the user, wherein the associating is based on relative importance;
   finding, using the at least one processor, information in a network that corresponds to the associated data tag; and
   generating a display on a user device, using the at least one processor, the display comprising information in the network and an email chain with highlighted text corresponding to the relative importance of the associated data tag.

10. The system of claim 9, wherein the relative importance is calculated by assigning an importance value, and wherein the importance value is determined by counting a number of times a word, image, symbol, or other representation of each data tag appears within a segment of the received user data.

11. The system of claim 9, wherein the user data further includes location data, and
    wherein the two or more data tags include at least one GPS tag from the location data.

12. The system of claim 9, wherein the method further comprises receiving, at the server, additional user data, and
    wherein the extracting, associating, finding, and generating are performed based on the received additional user data, thereby generating a new display that is output to a user interface.

13. The system of claim 9, wherein each data tag, of the two or more data tags, comprises one or more of a brand name, a product, a deal for a product, a stock ticker, and event information.

14. The system of claim 9, wherein the display is configured to be displayed on a home screen of the device of the user.

15. The system of claim 9, wherein the display is configured to be displayed near a message of the one or more messages in a user mailbox.

16. The system of claim 9, wherein the user data includes user data generated within a predetermined period of time.

17. A non-transitory computer readable storage medium storing instructions for presenting personalized content to a user, the instructions configured to cause at least one processor to perform a method comprising:
    receiving, at a server, user data corresponding to a user profile and at least one message of a user;
    extracting, using at least one processor, two or more data tags from the received user data;
    associating, using the at least one processor, at least one of the extracted data tags with a message of the at least one message of the user, wherein the associating is based on relative importance;
    finding, using the at least one processor, information in a network that corresponds to the associated data tag; and
    generating a display on a user device, using the at least one processor, the display comprising information in the network and an email chain with highlighted text corresponding to the relative importance of the associated data tag.

18. The non-transitory computer readable storage medium of claim 17, wherein the relative importance is calculated by assigning an importance value, and wherein the importance value is determined by counting a number of times a word, image, symbol, or other representation of each data tag appears within a segment of the received user data.

19. The non-transitory computer readable storage medium of claim 17, wherein the user data further includes location data, and wherein the two or more data tags include at least one GPS tag from the location data.

20. The non-transitory computer readable storage medium of claim 17, wherein the method further comprises receiving, at the server, additional user data, and wherein the extracting, associating, finding, and generating are performed based on the received additional user data, thereby generating a new display that is output to a user interface.

\* \* \* \* \*